(12) United States Patent
Namba

(10) Patent No.: US 6,931,398 B2
(45) Date of Patent: Aug. 16, 2005

(54) RETRIEVAL APPARATUS, RETRIEVAL METHOD AND RETRIEVAL PROGRAM

(75) Inventor: Isao Namba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 285 days.

(21) Appl. No.: 09/971,959

(22) Filed: Oct. 9, 2001

(65) Prior Publication Data

US 2002/0147716 A1 Oct. 10, 2002

(30) Foreign Application Priority Data

Apr. 6, 2001 (JP) ........................................ 2001-108307

(51) Int. Cl.[7] ............................................. G06F 17/30
(52) U.S. Cl. ...................... 707/5; 707/3; 707/6; 704/7; 704/10
(58) Field of Search .................. 707/1–10, 100–104.1, 707/200–206; 704/7, 9–10, 4; 715/530

(56) References Cited

U.S. PATENT DOCUMENTS

| 5,721,899 | A | * | 2/1998 | Namba ........................... 707/3 |
| 5,873,076 | A | * | 2/1999 | Barr et al. ...................... 707/3 |
| 5,950,187 | A | * | 9/1999 | Tsuda ............................ 707/3 |
| 6,101,488 | A | * | 8/2000 | Hayashi et al. ................ 706/45 |
| 6,205,456 | B1 | * | 3/2001 | Nakao ......................... 715/531 |
| 6,529,889 | B1 | * | 3/2003 | Bromberg et al. ............. 706/45 |
| 6,564,222 | B1 | * | 5/2003 | Sassano ....................... 707/102 |

OTHER PUBLICATIONS

S E Robertson, et al. "Okapi/Keenbow at TREC–8" NIST Special Publication 500–246. Information Technology: The Eighth Text Retrieval Conference (TREC–8). Nov. 2000. pp. 151–154, 161.

Ian H. Witten, et al. "Managaing Gigabytes Compressing and Indexing Documents and Images." 1994. pp. 141–148.

* cited by examiner

*Primary Examiner*—Shahid Alam
*Assistant Examiner*—Jean Bolte Fleurantin
(74) *Attorney, Agent, or Firm*—Staas & Halsey LLP

(57) ABSTRACT

By comprising a question sentence input unit for receiving a question sentence for retrieval, a retrieval execution unit for retrieving data from a database storing data to be retrieved and extracting data similar to the question sentence inputted by the question sentence input unit, a word contribution degree calculation unit for calculating the contribution degree of a word contributing to the extraction by the retrieval execution unit and a word contribution degree output unit for the contribution degree calculated by the word contribution degree calculation unit together with the corresponding word, the word to which importance is attached can be reported to a user.

19 Claims, 15 Drawing Sheets

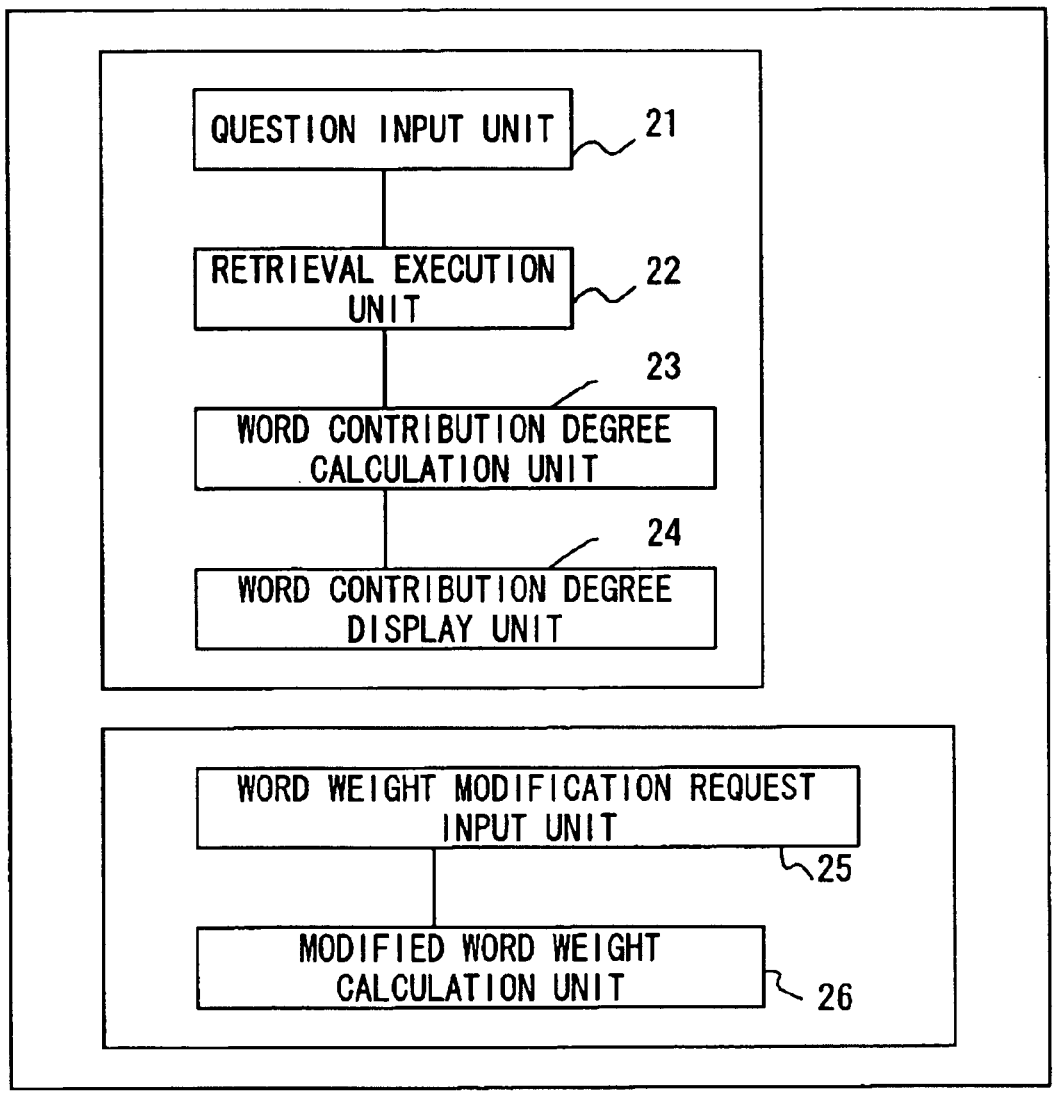
F I G. 2

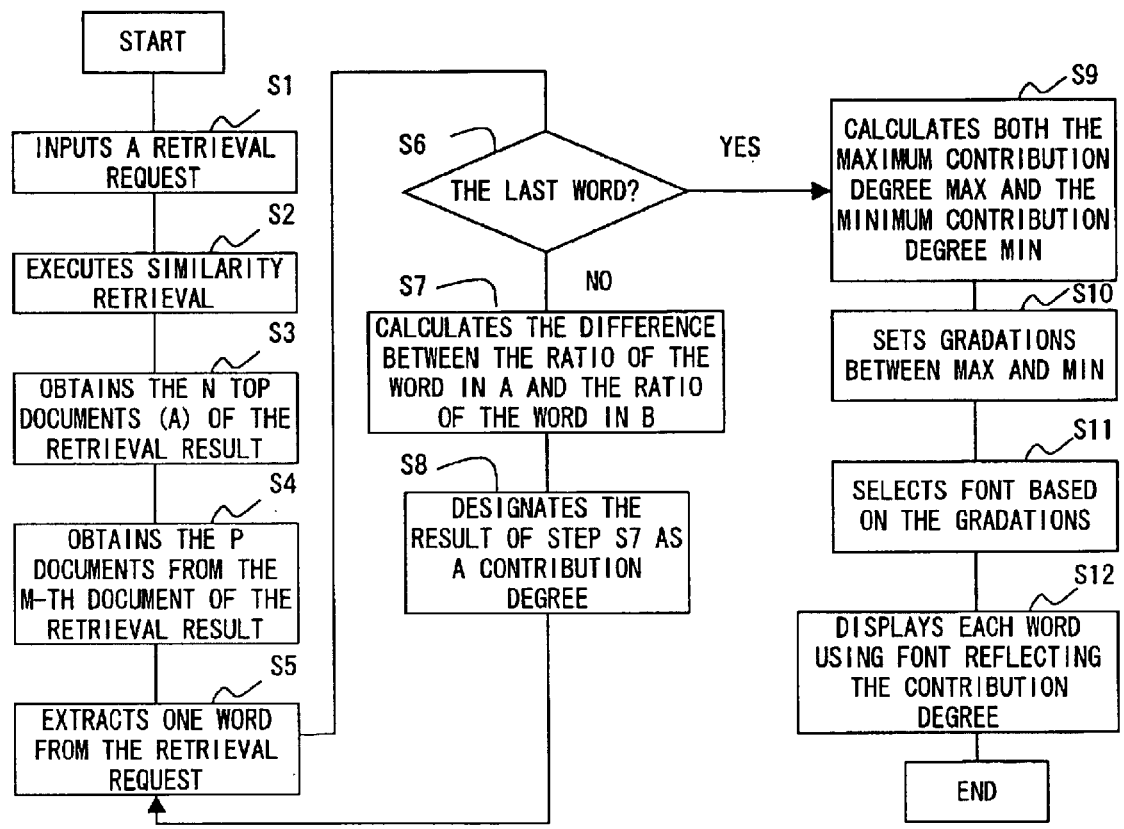
F I G. 3

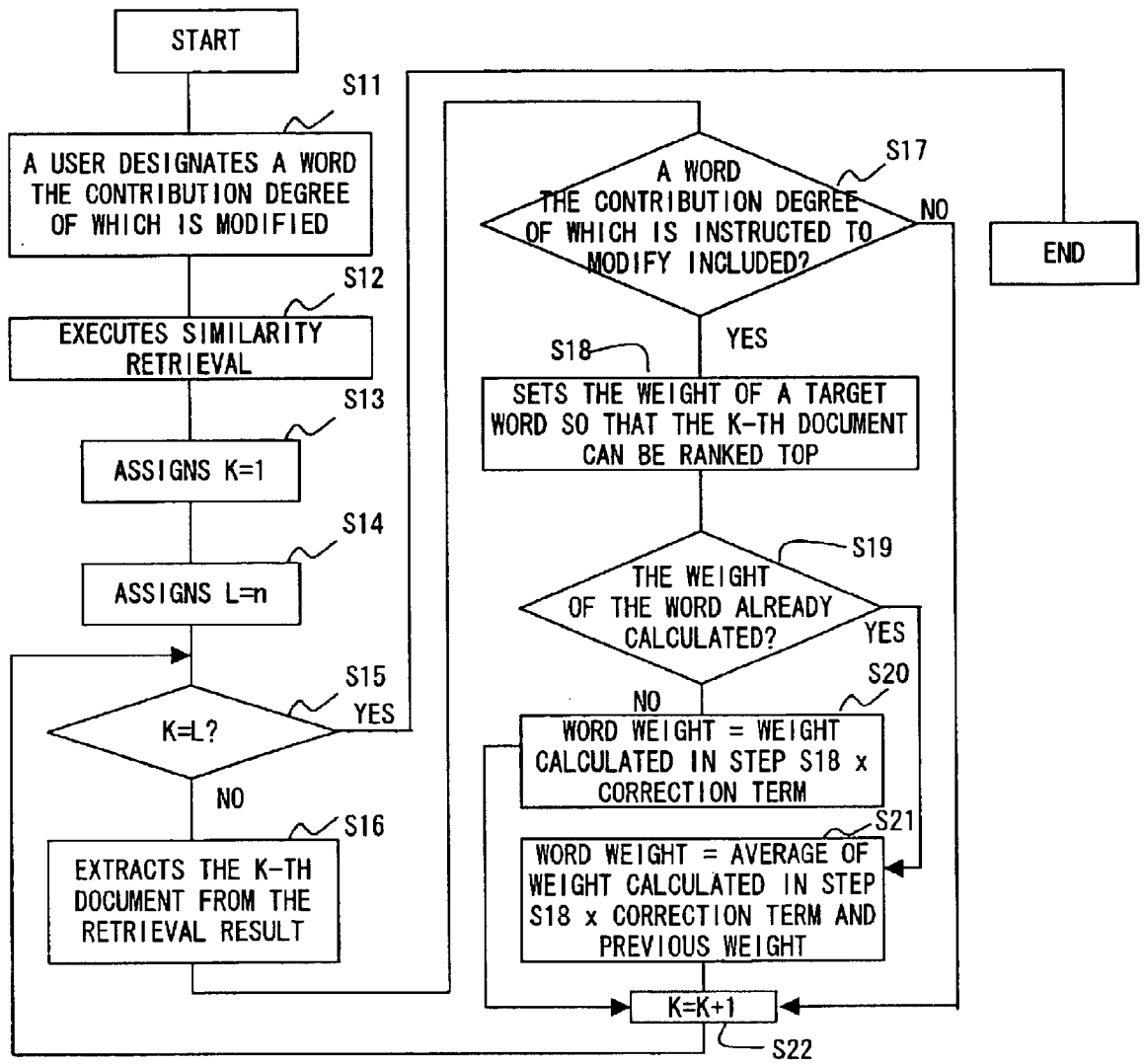
F I G. 4

- PURPOSE
  - SEARCHES FOR A WORD hybrid car

- QUESTION SENTENCE
  - INPUTS IN A NATURAL LANGUAGE (REQUEST FORMAT TO A SEARCHER)
  - TAKE TREC Query NO. 385 AS AN EXAMPLE
  - Identify documents that discuss the current status of hybrid automobile engines. (i.e., cars fueled by something other than gasoline only.) A relevant document may include research on non-gasoline powered engines or prototypes that may be fueled by natural gas, methanol, alcohol; cost to the consumer, health benefits derived; and shortcomings in horsepower and passenger comfort.

F I G. 5

- A = TOP 10 DOCUMENTS
- B = 200 DOCUMENTS FROM THE TOP 800 DOCUMENTS
- CALCULATION EXPRESSION
- CONTRIBUTION DEGREE CALCULATION EXPRESSION (Term Selection Value (Bougham formula))

$Tsv = (r/R - alpha * s/S) * w$
alpha = parameter
$w = r/(R-r) / (n-r)/(N-n-R+r)$
r = NUMBER OF DOCUMENTS, INCLUDING A TARGET WORD, OF A
R = A
n = NUMBER OF DOCUMENTS, INCLUDING A TARGET WORD
S = B
s = NUMBER OF DOCUMENTS, INCLUDING A TARGET WORD, OF B
N = NUMBER OF ALL DOCUMENTS

F I G. 6

- fuel 7.2
- methanol 6.8
- cars 6.1
- gas 5.4
- automobile 5.1
- gasoline 4.8
- natural 4.5
- powered 3.7
- alcohol 2.4
- engines 2.2
- consumer 2.1
- passenger 2.0
- prototypes 1.6
- research 1.0
- benefits 1.0
- derived 0.9
- health 0.7
- hybrid 0.6

FIG. 7

| | |
|---|---|
| 1 | Fuel, methanol, cars |
| 2 | gas, automobile, gasoline, natural |
| 3 | powered, alcohol, engines, consumer, passenger |
| 4 | prototype, research, benefits, derived, health, hybrid |

FIG. 8

| 1 | cars hybrid |
| --- | --- |
| 2 | gas, automobile, gasoline, natural |
| 3 | powered, alcohol, engines, consumer, passenger |
| 4 | Fuel, prototype, research, benefits, derived, health, |

MAXIMIZES THE CONTRIBUTION DEGREE OF A WORD hybrid

DROPS THE CONTRIBUTION DEGREE OF A WORD fuel

DELETES A WORD methanol

FIG. 9

|    | Cars | hybrid | gas | automobile | gasoline | natural | powered | alcohol | fuel |
|----|------|--------|-----|------------|----------|---------|---------|---------|------|
| 1  | 5    | 0      | 1   | 1          | 3        | 1       | 2       | 1       | 5    |
| 2  | 4    | 0      | 1   | 0          | 3        | 1       | 2       | 1       | 5    |
| 3  | 3    | 0      | 0   | 0          | 2        | 1       | 1       | 0       | 3    |
| ⋮  |      |        |     |            |          |         |         |         |      |
| 8  | 2    | 1      | 2   | 1          | 1        | 0       | 2       | 1       | 1    |
| 9  |      |        |     |            |          |         |         |         |      |
| 10 |      |        |     |            |          |         |         |         |      |
| ⋮  |      |        |     |            |          |         |         |         |      |
| 20 |      |        |     |            |          |         |         |         |      |
| ⋮  |      |        |     |            |          |         |         |         |      |
| 1000 |    |        |     |            |          |         |         |         |      |

FIG. 10

|   | Cars | hybrid | gas | automobile | gasoline | natural | powered | alcohol | fuel |
|---|------|--------|-----|------------|----------|---------|---------|---------|------|
| 1 | 5 | 0 | 1 | 1 | 3 | 1 | 2 | 1 | 5 |
| 2 | 4 | 0 | 1 | 1 | 3 | 1 | 2 | 1 | 5 |
| 3 | 3 | 0 | 0 | 0 | 2 | 1 | 1 | 0 | 3 |
| . |   |   |   |   |   |   |   |   |   |
| . |   |   |   |   |   |   |   |   |   |
| 8 | 2 | 1 | 2 | 1 | 1 | 0 | 2 | 1 | 1 |
| 9 |   |   |   |   |   |   |   |   |   |

· CALCULATION FOR RANKING UP A DOCUMENT, INCLUDING A WORD Hybrid

- THE SCORES OF THE TOP AND EIGHTH DOCUMENTS ARE 19 AND 11, RESPECTIVELY
- TO RANK UP THE EIGHTH DOCUMENT TO THE TOP, MULTIPLY THE WORD Hybrid BY 9
- WEIGHT OF THE WORD Hybrid 3 = 9 x 1/log(8)

· CALCULATION FOR RANKING DOWN A DOCUMENT, INCLUDING A WORD fuel

- THE SCORES OF THE TOP AND EIGHTH DOCUMENTS ARE 19 AND 11, RESPECTIVELY
- TO BRING THE TOP DOCUMENT CLOSE TO THE EIGHT, SET THE WORD fuel TO 1 (THE MINIMUM)
- WEIGHT OF THE WORD fuel 1/5 = 1/5 x 1/log (1)

F I G. 1 1

| | |
|---|---|
| hybrid | 5.3 |
| cars | 5.1 |
| gas | 4.8 |
| automobile | 4.6 |
| gasoline | 4.2 |
| natural | 4.1 |
| fuel | 4.1 |
| powered | 3.7 |
| prototypes | 3.4 |
| alcohol | 2.1 |
| engines | 1.3 |
| consumer | 1.1 |
| passenger | 1.0 |
| research | 0.9 |
| benefits | 0.5 |
| derived | 0.3 |
| health | 0.2 |

FIG. 12

- 1 hybrid ,cars ,gas , automobile
- 2 gasoline ,natural ,fuel ,powered,prototypes
- 3 alcohol    engines    consumer    passenger
- 4 research , benefits, derived, health

F I G. 13

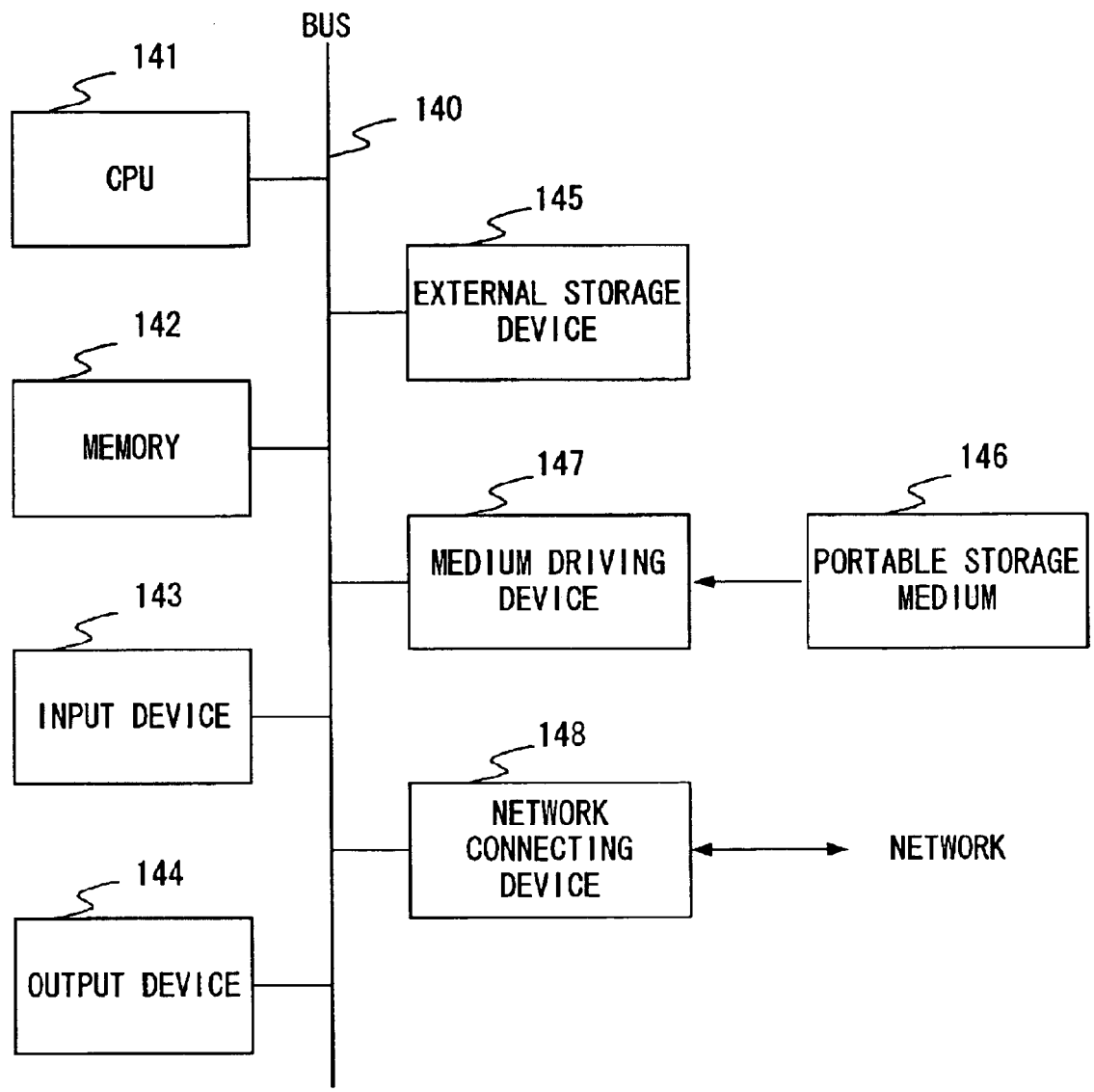
F I G. 1 4

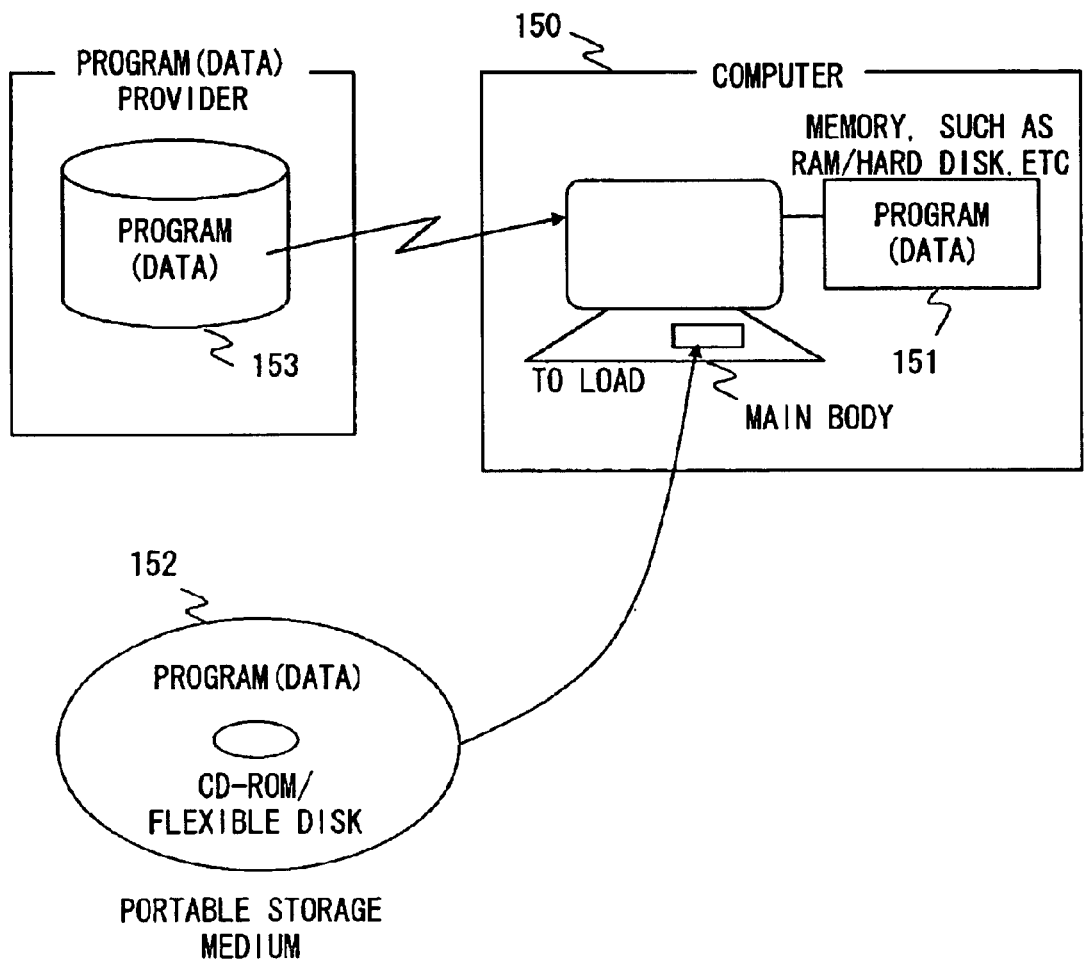
F I G. 1 5

RETRIEVAL APPARATUS, RETRIEVAL METHOD AND RETRIEVAL PROGRAM

BACKGROUND OF THE INVENTION

1. Field of the Invention

The present invention relates to a ranking document retrieval apparatus for giving priority to and presenting a retrieval result obtained by making retrievals in response to a retrieval request described in a natural language or a question consisting of inputted word strings, in descending order of document similarity.

2. Description of the Related Art

Conventionally, a ranking document retrieval apparatus gives priority to documents in descending order of similarity in response to a retrieval request inputted by a user and presents the retrieval result.

A ranking document retrieval technology is disclosed in, for example, "Managing Gigabytes, Compressing and Indexing Documents and Images, pp. 141–148.

Generally, a document similarity factor can be obtained by multiplying an importance degree in a document to be retrieved of a requested retrieval word (idf) by an importance degree in a respective document (tf).

However, usually, neither the importance degree of a word in a retrieval result nor a similarity retrieval method is disclosed to a user. Therefore, the operation is difficult for a user to understand.

Thus, if a document unexpectedly appears in a higher rank in response to a retrieval request, a user must estimate the movement of a ranking document retrieval apparatus and make retrievals by replacing a word or regenerating a question sentence (retrieval request), which is a problem.

SUMMARY OF THE INVENTION

The present invention is made in view of this problem, and it is an object of the present invention to provide a retrieval apparatus, a retrieval method and a retrieval program for notifying a user of a word to which importance is attached in retrieval and to allow a user to easily modify the weight of a word if an unintended similarity retrieval result is obtained.

The retrieval apparatus of the present invention comprises a question sentence input unit, a retrieval execution unit, a word contribution degree calculation unit, a word contribution degree output unit, a word designation unit and a weighting unit.

In the first aspect of the present invention, the question sentence input unit inputs a question sentence for retrieval. The retrieval execution unit retrieves data from a database storing data to be retrieved and extracts data similar to the question sentence inputted by the question sentence input unit. The word contribution degree calculation unit calculates the contribution degree of a word contributing to the extraction by the retrieval execution unit. The word contribution degree output unit outputs the contribution degree calculated by the word contribution degree calculation unit together with the corresponding word.

In the second aspect of the present invention, the word designation unit designates a word displayed on a screen. The weighting unit weights the word designated by the word designation unit.

In the third aspect of the present invention, the question sentence input unit inputs a retrieval question sentence for retrieval. The retrieval execution unit divides the question sentence inputted by the question sentence input unit into words, retrieves data from a database storing data to be retrieved, for each of the divided words and extracts data similar to the question sentence inputted by the question sentence input unit. The word contribution degree calculation unit calculates the contribution degree of a word contributing to the extraction by the retrieval execution unit. The word contribution degree output unit displays the contribution degree calculated by the word contribution degree calculation unit together with the corresponding word on a display. The word designation unit designates a word displayed on the screen. The weighting unit weights the word designated by the word designation unit.

BRIEF DESCRIPTION OF THE DRAWINGS

FIG. 2 shows the basic configuration of the present invention;

FIG. 3 is a flowchart showing the process flow of displaying the contribution degree of a word in a retrieval result;

FIG. 4 is a flowchart showing the process flow of a user modifying the contribution degree of the word in the retrieval result and weighting the word so as to reflect the modification content;

FIG. 5 shows one retrieval request, which specifies a document to be retrieved;

FIG. 6 shows both the calculation expression of the contribution degree and the setting values of parameters;

FIG. 7 shows the calculation result of the contribution degrees;

FIG. 8 displays the calculation result using four font gradations;

FIG. 9 shows one modification request of a word contribution degree;

FIG. 10 shows both the way that each word is located in a document ranked high in a similarity retrieval to be re-calculated and the scores;

FIG. 11 shows the re-calculation process;

FIG. 12 shows the contribution degrees of the retrieval result after weight correction;

FIG. 13 shows the display result after weight modification;

FIG. 14 shows the configuration of the retrieval apparatus; and

FIG. 15 shows the loading into a computer of a program in the present invention.

DESCRIPTION OF THE PREFERRED EMBODIMENTS

Figure 1:
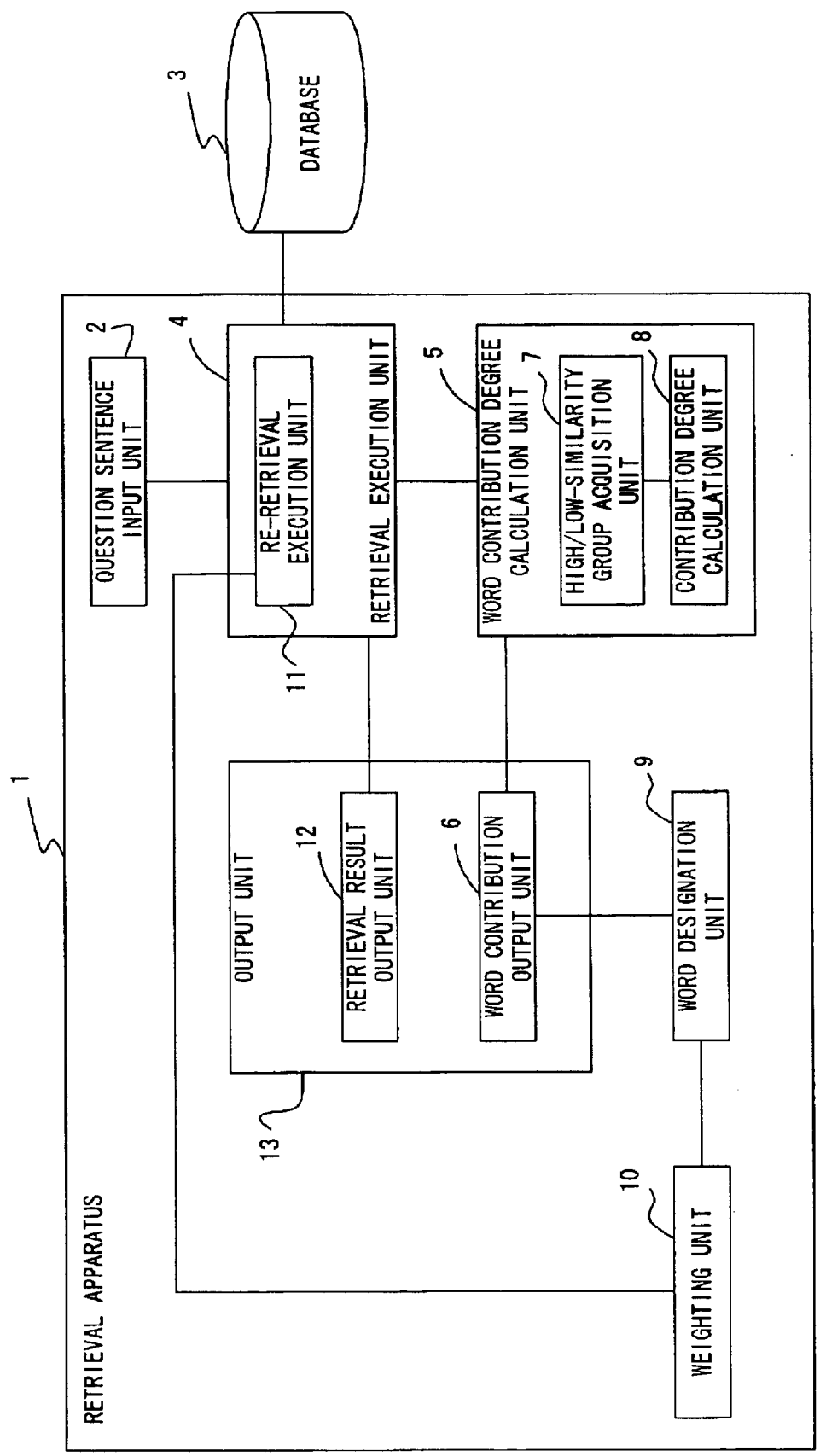
FIG. 1 shows the functional configuration of the retrieval apparatus adopting the present invention.

The preferred embodiments of the present invention are described in detail below with reference to the drawings.

The problem described above of the conventional ranking document retrieval apparatus is caused by the fact that a user cannot intuitively understand the reason why such a result is obtained. If retrieval records well, there is no problem. However, a step to be taken by a user when a user obtains an unexpected result from a ranking document retrieval apparatus is not clear.

The following document is a question sentence from TREC (Text Retrieval Conference).

"Identify documents that discuss the current status of hybrid automobile engines, (i.e., cars fueled by something other than gasoline only).

A relevant document may include research on non-gasoline powered engines or prototypes that may be fueled by natural gas, methanol, alcohol; cost to the customer; health benefits derived; and shortcomings in horsepower and passenger comfort."

Although this question sentence takes such a format of a retrieval request that can reach a searcher in an arranged form, documents with a word "fuel" or "car" as a subject rank high and results related to a word "hybrid fueled car" do not rank high if this document is inputted to a ranking document retrieval apparatus using a natural language as input, as a retrieval request without any process. In this case, if the retrieval result is carefully examined, it can be found that a word "hybrid" has a low importance degree in a ranking document retrieval apparatus and that if there is a word "car" or "fuel", a desired result cannot be obtained since documents with such a word as a central idea rank high. However, it is not easy for a general user to make this judgment.

In such a case, if a user weights a word "hybrid", an appropriate retrieval may be obtained. However, if word weight is designated by a small numeric value, it is not easy since there is neither a calculation nor designation method for weighting words balanced with a word "fuel" or "car" currently weighted.

To solve the problem described above, the present invention adopts the following configurations.

(1) A word to which importance is attached is reported to a user by displaying the effectiveness (contribution degree) of the word judged by a ranking document retrieval apparatus side, in gradations so as to represent the tendency of the whole retrieval result.

(2) Both an interface and an internal calculation function for modifying the weight of a designated word so that an appropriate contribution degree can be obtained from a retrieval result are implemented. Thus, if a user obtains an unintended similarity retrieval result, the user can easily modify the weight of the word.

Specifically, according to one aspect of the present invention, the retrieval apparatus of the present invention comprises a question sentence input unit for inputting a retrieval question sentence, a retrieval execution unit for retrieving data from a database storing data to be retrieved and extracting data similar to the question sentence inputted by the question sentence input unit, a word contribution degree calculation unit for calculating the contribution degree of a word contributing to the extraction by the retrieval execution unit from the retrieval result extracted by the retrieval execution unit and a word contribution degree output unit for outputting the contribution degree calculated by the word contribution degree calculation unit together with the corresponding word.

In the retrieval apparatus of the present invention, it is also preferable for the word contribution degree output unit to display the corresponding word in a display form reflecting the contribution degree.

In the retrieval apparatus of the present invention, it is also preferable for the retrieval execution unit to divide a question sentence inputted by the question sentence input unit into words, to retrieve data from the database for each of the divided words and to extract similar data.

In the retrieval apparatus of the present invention, it is also preferable for the word contribution degree calculation unit to further comprise a high/low-similarity group acquisition unit for obtaining a group of documents with high similarity and a group of documents with low similarity from a retrieval result extracted by the retrieval execution unit and a contribution degree calculation unit for calculating the difference between a ratio of the divided word in the high-similarity group and a ratio of the divided word in the low-similarity group and designating the difference as the contribution degree of the divided word.

According to another aspect of the present invention, the retrieval apparatus of the present invention is used to extract data similar to a question word by retrieval and to display the contribution degree of a word contributing to the extraction together with the corresponding word on a screen. The retrieval apparatus comprises a word designation unit for designating a word displayed on the screen and a weighting unit for weighting the word designated by the word designation unit for the retrieval.

FIG. 1 shows the functional configuration of the retrieval apparatus adopting the present invention.

The retrieval apparatus 1 shown in FIG. 1 comprises a question sentence input unit 2, a retrieval execution unit 4, a word contribution degree calculation unit 5, a word designation unit 9, a weighting unit 10 and an output unit 13. The retrieval apparatus 1 extracts data similar to a question word by retrieval and displays the contribution degree of a word contributing to the extraction together with the corresponding word on a screen.

The retrieval execution unit 4 further comprises a re-retrieval execution unit 11. The word contribution degree calculation unit 5 further comprises a high/low-similarity group acquisition unit 7 and a contribution degree calculation unit 8. The output unit 13 further comprises a word contribution degree output unit 6 and a retrieval result output unit 12.

The question sentence input unit 2 receives a question sentence for retrieval.

The retrieval execution unit 4 retrieves data from a database 3 storing data to be retrieved and extracts data similar to the question sentence inputted by the question sentence input unit 2.

The retrieval execution unit 4 also divides the question sentence inputted by the question sentence input unit 2 into words, retrieves data from the database 3 for each of the divided words and extracts similar data.

The word contribution degree calculation unit 5 calculates the contribution degree of a word contributing to the extraction by the retrieval execution unit 4 in the retrieval result extracted by the retrieval execution unit 4.

The word contribution degree output unit 6 outputs the contribution degree calculated by the word contribution degree calculation unit 5 together with the corresponding word to a display device, such as a CRT display, an LCD display, a plasma display, etc., or a printing device, such as a laser beam printer, an inkjet printer, etc., and the like. They are outputted in a display reflecting the contribution degree, using a font reflecting the contribution degree, in a character size reflecting the contribution degree, in a color reflecting the contribution degree, etc.

The high/low-similarity group acquisition unit 7 obtains both a group of documents with high similarity and a group of documents with low similarity from the retrieval result extracted by the retrieval execution unit 4.

The contribution degree calculation unit 8 calculates the difference between a ratio of the divided word in the high-similarity group and a ratio of the divided word in the low-similarity group, and designates the difference as the contribution degree of the divided word.

The word designation unit 9 designates a word displayed on the screen.

The weighting unit 10 weights the word designated by the word designation unit 9 for retrieval.

The weighting unit 10 also weights a word so that the data of the retrieval result can be ranked as the top.

The weighting unit 10 also sequentially weights a plurality of prescribed data of the retrieval result so that the data of the retrieval result can be ranked as the top and designates an average of the plurality of weight of the plurality of data as the weight value of the word.

The re-retrieval execution unit 11 retrieves data from the database 3 and extracts data similar to the word weighted by the weighting unit 10.

The retrieval apparatus 1 can also comprise the database 3.

FIG. 2 shows the basic configuration of the present invention.

In FIG. 2, a question sentence input unit 21 receives a question sentence inputted by a user.

A retrieval execution unit 22 conducts retrieval based on the question sentence inputted by the user.

A word contribution degree calculation unit 23 calculates the effectiveness of words in the question sentence in the retrieval result.

A word contribution degree display unit 24 displays the contribution degree of a word the retrieval of which is requested.

A word weight modification request unit 25 receives the modification request on word weight from a user.

A modified word weight calculation unit 26 calculates word weight so that the effectiveness of the word designated by the user can increase and weights the word.

FIG. 3 is a flowchart showing the process flow of displaying the contribution degree of a word in a retrieval result.

In step S1, a retrieval request is received (inputted) from a user.

In step S2, in response to the retrieval request inputted in step S1 or otherwise properly, the retrieval request is divided into words, ranking retrieval is conducted and results are obtained in descending order of the association degree of a document.

In step S3, the top N documents are obtained from the result of the retrieval in step S2. These documents can be judged to most satisfy the retrieval request by the retrieval apparatus. The group of these N documents is designated as A. The top N documents are not limited to the first up to the N-th documents. For example, they can also be every other top N documents.

Instep S4, P documents from the M-th document that in the retrieval result are obtained. Although these documents are extracted as a retrieval result, the importance of the documents can be judged as not ranking as high in the retrieval result. The group of these P documents is designated as B. In this case, they are not limited to P documents from the M-th up to the (M+P−1)-th. For example, they can also be every other P documents. M can be greater or smaller than N.

In step S5, one word is extracted from the retrieval request.

In step S6, it is judged whether the word to be processed is the last word. If it is the last word, the process proceeds to step S9. Otherwise, the process proceeds to step S7.

In step S7, the respective ratios of a word to be processed, in A and B, are calculated. For the calculation expression of such a contribution degree, Term selection value (Okapi system), Term selection value (Bougham formula), Relevance feedback formula (Rocchio) and the like can be used.

Term selection values are described in detail in "The English Text Retrieval Conference (TREC-8)", NIST (National Institute of Standards and Technology), pp. 151–161.

Then, in step S8, the result obtained in step S7 is regarded as the contribution degree and is attached to the word. Then, the process returns to step S5.

A series of steps S5 through S8 is a loop process. In the process, words are extracted from a retrieval request and the contribution degree of each word is calculated.

Then, in step S9, both the maximum (Max) and minimum (Min) contribution degrees of each word are calculated.

In step S10, to display the contribution degrees in gradations, the contribution degrees between Min and Max are divided into a specific number of gradations. For example, the gradations can be equally set.

In step S11, a display font is set in accordance with the gradations.

In step S12, the contribution degree of each word in a retrieval result is displayed using a font reflecting the contribution degree.

FIG. 4 is a flowchart showing the process of a user modifying the contribution degree of a word in a retrieval result and weighting the word so as to reflect the modification content.

In step S11, a user designates a word, the contribution degree of which is modified.

In step S12, similarity retrieval is conducted.

In step S13, K=1 is assigned and in step S14, L=n is assigned. n represents the number of documents extracted from the top.

In steps S13 and S14, a document ranking K-th is extracted from the retrieval result until K=L is satisfied, and calculation for weighting a word for correction is conducted.

In step S15, it is judged whether the current target document is the last one (K=L).

If the word is the last one, the process terminates. Otherwise, the process proceeds to step S16.

In step S16, the K-th document is extracted as a target document.

In step S17, it is checked whether the K-th document includes a word, the contribution degree of which should be modified.

If the K-th document does not include the word, the process proceeds to step S22. Otherwise, the process proceeds to step S18.

In step S18, the weight value to be attached to a candidate word so that the current K-th document can be ranked as the top is calculated.

In step S19, a process varies depending on whether a weighting is already set to the word. If a weighting is not set yet, the word weight calculated for the K-th document is set. Otherwise, the average of the word weight calculated for the K-th document and the previous weight is set.

Specifically, in step S10, the word weight calculated for the K-th document is set.

In step S11, the average of the word weight calculated for the K-th document and the previous weight is set.

In either case, to prevent the weight modified and calculated from taking too much importance, it is required that the higher the ranking of a document for which weight is calculated, the more effective the weight can be. For example, to prevent the influence of a weight calculated to increase in rank a document from low-similarity to high-similarity from being too much, the calculated weight can be corrected by multiplying by 1/log (current ranking of a document to be processed) and the like.

A series of steps S19 through S21 is an averaging process.

In step S22, to process a subsequent document, the number of K is incremented by one. Then, the process returns to step S16.

A series of steps S15 through S22 is a loop process. In the process, each of the top n documents is extracted and a designated word is weighted to improve the contribution degree of the word.

In the following preferred embodiment, an English document is retrieved by a retrieval request described in a natural language, the contribution degree of a word in a retrieval result is displayed using a font. Specifically, the retrieval apparatus displays word weight using four font sizes for a user.

FIG. 5 shows one retrieval request, which specifies a document to be retrieved. The document is extracted from Query No. 385 of TREC (Text Retrieval Conference).

The question sentence describes both a retrieval request for words "hybrid car" and the details of a document to be retrieved.

FIG. 6 shows both the calculation expression of a contribution degree and the setting values of parameters.

For the calculation of the contribution degree, both the top 10 documents and 200 documents from the top 800 documents are assumed to be extracted from groups with a high association degree (A in FIG. 3) and groups with a low association degree (B in FIG. 3), respectively. In this case, 1000 or more retrieval results are expected. However, if the number of retrieval results is less than 1000, the last 20% of the obtained results can also be designated as B.

Although for the calculation expression of a contribution degree (ratio judging method), Term selection value (Bougham formula) is used, an arbitrary calculation expression can also be used.

FIG. 7 shows the calculation result of contribution degrees.

In FIG. 7, the contribution degree 7.2 of a word "fuel" ranks as the top and the contribution degree (0.6) of a word "hybrid" in a retrieval request ranks as the low. From the fact, it is found that an unintended document is extracted.

FIG. 8 shows contribution degrees using four font sizes.

In FIG. 8, words between a word with the highest score and a word with the lowest score are equally divided into four font groups, the difference in font size between each two of the four groups is eight points, the words are grouped based on the contribution degrees and arranged in descending order. Thus, it is found that words "fuel", "methanol" and "cars" are dominant in the retrieval result.

Although in the example shown in FIG. 8, all the words are equally divided, for example, to highlight words with a high contribution degree, three words with a high contribution degree can also be placed in the first group and the other words can be equally divided.

FIG. 9 shows one modification request of the contribution degree of a word.

This is a user's trial for modifying a contribution degree and obtaining a desired result, and FIG. 9 shows the operation against an input interface.

Out of the high-ranking words, a word "methanol" is deleted since it is remotely related, and the contribution degree of a word "fuel" is reduced. The contribution degree of a word "hybrid", which is the keyword, is set so that the contribution degree of a word "hybrid" may be ranked as the top.

FIG. 10 shows both the way that each word is located in a document ranked high in similarity retrieval for re-calculation and the scores.

In FIG. 10, the score of a document is obtained by summing the score of each word. Vertical figures indicate the ranking of each document. For example, in a document ranked as the top, the scores of words "cars" and "hybrid" are 5 and 0, respectively.

FIG. 11 shows a re-calculation process.

A document ranked eighth, including a word "hybrid", can be increased in rank to the top by multiplying the score of the word "hybrid" by 9. Thus, this is designated as the weight. However, if this weight is directly used for the documents of all the rankings, even a document with a low total score can be increased in rank by the weight of only one word. Thus, in this example, log (document ranking) is multiplied by a word to reduce the weight influence if the word ranks low.

In the case of a word "fuel", the reverse process is performed. Specifically, a weight is calculated to reduce the rank of a document ranked from the top to 10-th. In this example, it is assumed that the minimum score is 1, and a weight of less than 1 to be multiplied by the word "fuel" is calculated to reduce the score to 1.

FIG. 12 shows the contribution degrees of a retrieval result after weight correction.

It is found that the score of the word "hybrid" becomes 5.3 and is ranked as the top while the word is balanced with other retrieval words.

FIG. 13 shows the display result after weight modification.

It is found that the display size of the word "hybrid", which is ranked high by weight correction, is enlarged.

Although the preferred embodiments of the present invention are to this point described with reference to the drawings, a retrieval apparatus to which the present invention is applied is not limited to the preferred embodiments described above. Only if the function is implemented, can the apparatus be a single apparatus, a system/integration consisting of a plurality of apparatuses or a system in which the process is performed through a network, such as a LAN, WAN and the like.

As shown in FIG. 14, the present invention can be implemented by a system comprising a CPU 141, a memory, such as a ROM and RAM, an input device 143, an output device 144, an external storage device 145, a medium driving device 147, a portable storage medium 146 and a network connecting device 148, which are all connected by a bus 140. Specifically, the function of the present invention can also be implemented by providing the retrieval apparatus with the memory 142, such as a ROM and a RAM, external storage device 145 or portable storage medium 146 which stores the software program code for implementing the system in the preferred embodiment described above and by enabling the computer of the retrieval apparatus to read and execute the program codes.

In this case, the program codes read from the portable storage medium 146 and the like enable the computer to implement the new function of the present invention, and the portable storage medium 146 and the like which stores the program codes constitutes the present invention.

For the portable storage media for providing the program code, for example, a flexible floppy disk, a hard disk, an optical disk, a magneto-optical disk, a CD-ROM, a CD-R, a DVD-ROM, a DVD-RAM, a magnetic tape, a non-volatile memory card, a ROM card, a variety of storage media that store the program codes through the network connection device (in other words, communications line), such as electronic mail, personal communications, etc., and the like can be used.

Although the function of the preferred embodiment described above can be implemented by enabling a computer 150 to execute the program code read in a memory 151, as shown in FIG. 15, the function can also be implemented by enabling an OS that is operated in the computer and the like to perform a part or all of the actual process according to the instructions of the program codes.

Furthermore, the function of the preferred embodiment described above can also be implemented by writing the program code read from the portable storage medium 152 or program/data 153 provided by a program/data provider, in the memory 151 which is provided in a function extension board inserted in the computer 150 or provided in a function extension unit connected to the computer 150 and enabling a CPU and the like which is provided in the function extension board or unit to perform a part or all of the actual process.

In other words, the present invention is not limited to the preferred embodiments described above and can take a variety of configurations or structures within the scope of the objective of the present invention.

As described above, according to the present invention, the contribution degree of a word in a retrieval result can be intuitively displayed and a user can easily modify the contribution degree. Therefore, a retrieval operation can be controlled.

What is claimed is:

1. A retrieval apparatus, comprising:
   a question sentence input unit receiving a question sentence for retrieval;
   a retrieval execution unit retrieving data from a database and extracting data similar to the question sentence inputted by the question sentence input unit;
   a word contribution degree calculation unit calculating a contribution degree of a word contributing to extraction by the retrieval execution unit in a retrieval result extracted by the retrieval execution unit; and
   a word contribution degree output unit outputting the contribution degree calculated by the word contribution degree calculation unit together with a corresponding word.

2. The retrieval apparatus according to claim 1, wherein said word contribution degree output unit outputs the corresponding word in a display format reflecting the contribution degree.

3. The retrieval apparatus according to claim 1, wherein said word contribution degree output unit outputs the corresponding word using a font reflecting the contribution degree.

4. The retrieval apparatus according to claim 1, wherein said word contribution degree output unit outputs the corresponding word in a character size reflecting the contribution degree.

5. The retrieval apparatus according to claim 1, wherein said word contribution degree output unit outputs the corresponding word in a color reflecting the contribution degree.

6. The retrieval apparatus according to claim 1, wherein said word contribution degree output unit is a display device.

7. The retrieval apparatus according to claim 1, wherein said retrieval execution unit divides the question sentence inputted by said question sentence input unit into words, retrieves data from the database for each of the divided words and extracts data similar to the word.

8. A retrieval apparatus, comprising:
   a question sentence input unit receiving a question sentence for retrieval;
   a retrieval execution unit retrieving data from a database and extracting data similar to the question sentence inputted by the question sentence input unit;
   a word contribution degree calculation unit calculating a contribution degree of a word contributing to extraction by the retrieval execution unit in a retrieval result extracted by the retrieval execution unit; and
   a word contribution degree output unit outputting the contribution degree calculated by the word contribution degree calculation unit together with a corresponding word, and
   wherein said retrieval execution unit divides the question sentence inputted by said question sentence input unit into words, retrieves data from the database for each of the divided words and extracts data similar to the word, and
   wherein said word contribution degree calculation unit further comprises:
      a high/low-similarity group acquisition unit obtaining both a group of documents with high similarity a group of documents with low similarity from the retrieval result extracted by said retrieval execution unit; and
      a contribution degree calculation unit calculating a difference between a ratio of the divided word in the high-similarity group and the ratio of the word in the low-similarity group and designating the difference as a contribution degree of the word.

9. A retrieval apparatus, comprising:
   a question sentence input unit inputting a question sentence for retrieval;
   a retrieval execution unit dividing the inputted question sentence inputted by the question sentence input unit into words, retrieving data from a database storing data to be retrieved for each of the divided words, and extracting data similar to the question sentence inputted by said question sentence input unit;
   a word contribution degree calculation unit calculating a contribution degree of a word contributing to the extraction by the retrieval execution unit in a retrieval result extracted by the retrieval execution unit;
   a word contribution degree output unit displaying the contribution degree calculated by the word contribution degree calculation unit together with a corresponding word on a screen;
   a word designation unit designating the word displayed on the screen; and
   a weighting unit weighting the word designated by the word designation unit for the retrieval.

10. The retrieval apparatus according to claim 9, wherein said weighting unit weights a word so that data of the retrieval result can be ranked as the top.

11. The retrieval apparatus according to claim 9, further comprising:
   a re-retrieval execution unit retrieving data from a database storing data to be retrieved and extracting data similar to a word weighted by said weighting unit.

12. A retrieval apparatus for extracting data similar to a question word by retrieval and displaying a contribution degree of a word contributing to the extraction together with a corresponding word on a screen, comprising:
   a word designation unit designating a word displayed on the screen;

a weighting unit weighting the word designated by the word designation unit for the retrieval;

a re-retrieval execution unit retrieving data from a database storing data to be retrieved and extracting data similar to a word weighted by said weighting unit, and wherein said weighting unit sequentially weights a plurality of prescribed data of the retrieval result so that the data of the retrieval result can be ranked as the top and designates an average of the plurality of weights of the plurality of data as a weight value of the word.

13. A retrieval computer-implement method, comprising:

receiving a question sentence for retrieval; retrieving data from a database storing data to be retrieved;

extracting data similar to the inputted question sentence;

calculating a contribution degree of a word contributing to the extraction in the extracted retrieval result; and outputting the calculated contribution degree together with a corresponding word, and wherein the inputted question sentence is divided into words, the database is retrieved for each of the divided words and similar data are extracted, and wherein the calculation obtains both a group of documents with high similarity and a group of documents with low similarity from the retrieval result, calculates a difference between a ratio of each divided word in the high-similarity group and a ratio of the word in the low-similarity group and designates the difference as a contribution degree of the divided word.

14. A retrieval computer-implement method, comprising:

inputting a question sentence for retrieval;

dividing the inputted question sentence into words;

retrieving data from a database storing data to be retrieved for each of the divided words;

extracting data similar to the inputted question sentence;

calculating a contribution degree of a word contributing to the extraction in the extracted retrieval result;

displaying the calculated contribution degree together with a corresponding word on a screen;

designating the word displayed on the screen; and weighting the designated word for the retrieval.

15. The retrieval method according to claim 14, wherein the weight is attached so that the data of the retrieval result can be ranked as the top.

16. The retrieval method according to claim 14, wherein a database storing data to be retrieved is retrieved and data similar to the words to which the weight is attached are extracted.

17. A retrieval method for extracting data similar to a question word by retrieval and displaying a contribution degree of a word contributing to the extraction together with a corresponding word on a screen, comprising:

designating a word displayed on the screen; and weighting the designated word for the retrieval, and, wherein database storing data to be retrieved is retrieved, data similar to the words to which the weight is attached are extracted, the weight is sequentially attached to a plurality of prescribed data of the retrieval result so that the data of the retrieval result can be ranked as the top and an average of the plurality of weight of the plurality of data is designated as a weight value of the word.

18. A retrieval program for enabling a computer to execute a function, the function comprising:

inputting a question sentence for retrieval;

dividing the inputted question sentence into words;

retrieving data from a database storing data to be retrieved for each of the divided words;

extracting data similar to the inputted question sentence;

calculating a contribution degree of a word contributing to the extraction in the extracted retrieval result;

displaying the calculated contribution degree together with a corresponding word on a screen;

designating the word displayed on the screen; and weighting the designated word for the retrieval.

19. A retrieval apparatus, comprising:

question sentence input means for inputting a question sentence for retrieval;

retrieval execution means for retrieving data from a database storing data to be retrieved and extracting data similar to the question sentence inputted by the question sentence input means;

word contribution degree calculation means for calculating a contribution degree of a word contributing to extraction by the retrieval execution means in a retrieval result extracted by the retrieval execution means; and word contribution degree output means for outputting the contribution degree calculated by the word contribution degree calculation means together with a corresponding word.

* * * * *